United States Patent
Jain et al.

(10) Patent No.: US 10,360,334 B2
(45) Date of Patent: Jul. 23, 2019

(54) CONTEXT AWARE PROCESSING TO RESOLVE STRONG SPACING EFFECTS DUE TO STRAIN RELAXATION IN STANDARD CELL LIBRARY

(71) Applicant: GLOBALFOUNDRIES INC., Grand Cayman (KY)

(72) Inventors: Navneet Jain, Milpitas, CA (US); Mahbub Rashed, Cupertino, CA (US); Juhan Kim, Santa Clara, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 269 days.

(21) Appl. No.: 15/428,449

(22) Filed: Feb. 9, 2017

(65) Prior Publication Data

US 2018/0225406 A1 Aug. 9, 2018

(51) Int. Cl.
 *G06F 17/50* (2006.01)
(52) U.S. Cl.
 CPC ...... *G06F 17/5072* (2013.01); *G06F 17/5077* (2013.01); *G06F 2217/84* (2013.01)
(58) Field of Classification Search
 CPC ............. G06F 17/5031; G06F 17/5045; G06F 17/5072; G06F 17/5081; G06F 2217/84
 USPC ........................................................ 716/113
 See application file for complete search history.

(56) References Cited

U.S. PATENT DOCUMENTS

| | | | |
|---|---|---|---|
| 6,728,943 B2 | 4/2004 | Kanamoto | |
| 7,207,022 B2 | 4/2007 | Okudaira | |
| 8,276,109 B2 | 9/2012 | Penzes et al. | |
| 8,621,403 B2 | 12/2013 | van Ginneken et al. | |
| 8,645,888 B2 | 2/2014 | Tetelbaum | |
| 8,775,999 B2 | 7/2014 | Chueh et al. | |
| 9,177,096 B2 | 11/2015 | Sundareswaran et al. | |
| 2015/0064864 A1 | 3/2015 | Bowers et al. | |
| 2015/0278425 A1* | 10/2015 | Sundareswaran ... | G06F 17/5081 716/55 |
| 2016/0292333 A1* | 10/2016 | Kapoor ............... | G06F 17/5031 |

\* cited by examiner

*Primary Examiner* — Paul Dinh
(74) *Attorney, Agent, or Firm* — Gibb & Riley, LLC; Francois Pagette

(57) ABSTRACT

Methods and systems assign an alignment context to each of the cells within an integrated circuit layout, from previously established alignment contexts, based on how the different cell widths cause each of the cells to align with adjoining cells. Also, such methods and systems retrieve standard signal delay times for each of the cells from a standard cell library. This allows these methods and systems to adjust the signal delay times for each of the cells based on which alignment context has been assigned to each of the cells, to produce adjusted delay times for each of the cells. Following this, the methods and systems perform a timing analysis of the layout using the adjusted delay times for each of the cells, and output the results of the timing analysis.

20 Claims, 7 Drawing Sheets

ALIGNMENT CONTEXT ASSIGNMENT TABLE

| LEFT CELL RATIO | RIGHT CELL RATIO | ALIGNMENT CONTEXT |
|---|---|---|
| 1.0 | 1.0 | A |
| 1.0 | 0.5 | B |
| 0.5 | 1.0 | C |
| 0.5 | 0.5 | D |
| 1.0 | 0.3 | E |
| 1.0 | 0.6-0.9 | F |
| 0.2-0.6 | 0.5-0.7 | G |
| 0.7 | 1.0 | H |

DELAY ADJUSTMENT TABLE

| CELL TYPE | CONTEXT A | CONTEXT B | CONTEXT C | CONTEXT D |
|---|---|---|---|---|
| 1 | 0.3 | 1.1 | 0.9 | 1.0 |
| 2 | 0.3 | 1.2 | 0.8 | 1.3 |
| 3 | 0.3 | 1.1 | 0.7 | 0.8 |
| 4 | 0.2 | 1.6 | 0.7 | 0.8 |

FIG. 8

CONTEXT AWARE PROCESSING TO RESOLVE STRONG SPACING EFFECTS DUE TO STRAIN RELAXATION IN STANDARD CELL LIBRARY

BACKGROUND

Systems and methods herein generally relate to performing a timing analysis of an integrated circuit design.

Delay calculations of circuit designs are used to ensure that the longest (critical) delay path does not exceed a required time maximum to process signals, and this is the process of checking the timing performance of the circuit. Delays of individual devices (e.g., a logic gate and the wires attached to it) are included in standard cell libraries, and the process of performing static timing analysis computes the delays of entire paths, by combining the previously computed delay of individual devices. However, sometimes devices perform differently based on their placement relative to other devices, and this can render the timing analysis of a circuit incorrect.

SUMMARY

Methods herein receive a circuit design into a design automation system, and automatically identify cells in a standard cell library that correspond to components within the circuit design, using a processor of the design automation system. These methods automatically perform a placement process for the circuit design by assigning physical locations to the cells to produce a layout using the processor. The layout has continuous linear active areas of the cells adjoining one another, and the cells have different widths perpendicular to the continuous linear active areas (e.g., gates of the transistors run in a direction parallel to the width of the cells).

The methods automatically assign an alignment context to each of the cells, from previously established alignment contexts, based on how the different widths cause each of the cells to align with each of the adjoining cells, using the processor. For example, the alignment context can be assigned by comparing the ratio of the width (perpendicular to the continuous linear active areas) of a first cell to a width of a second cell contacting the first cell, to produce a width-to-width ratio, and then matching the width-to-width ratio to a table to assign one of the alignment context to each cell. Each of the alignment contexts reference a different delay multiple that is based on how each of the alignment contexts cause different amounts of strain within the cells, and the strain changes how quickly the transistors in the cells process signals.

Also, such methods automatically retrieve standard signal delay times for each of the cells from the standard cell library, using the processor. This allows these methods to automatically adjust the signal delay times for each of the cells based on which alignment context has been assigned to each of the cells, to produce adjusted delay times for each of the cells using the processor. This is performed by multiplying the signal delay times by the delay multiple of the assigned alignment context for each cell.

Following this, the methods automatically perform a timing analysis of the layout using the adjusted delay times for each of the cells, and output the results of the timing analysis from an interface of the design automation system.

Various design automation systems herein include (among other components) a processor, a standard cell library operatively connected to (meaning directly or indirectly connected to) the processor, an alignment context table operatively connected to the processor, an interface operatively connected to the processor, etc.

The design automation systems receive a circuit design into the interface, and the processor automatically identifies cells in the standard cell library that correspond to components within the circuit design. The processor automatically performs a placement process for the circuit design by assigning physical locations to the cells to produce a layout. The layout has continuous linear active areas of the cells adjoining one another, and the cells have different widths perpendicular to the continuous linear active areas (e.g., gates of the transistors run in a direction parallel to the width of the cells).

The processor automatically assigns an alignment context to each of the cells, from previously established alignment contexts in the alignment context table, based on how the different widths cause each of the cells to align with each of the adjoining cells. For example, the alignment context can be assigned by comparing the ratio of the width (perpendicular to the continuous linear active areas) of a first cell to a width of a second cell contacting the first cell, to produce a width-to-width ratio, and then matching the width-to-width ratio to a table to assign one of the alignment context to each cell. Each of the alignment contexts reference a different delay multiple that is based on how each of the alignment contexts cause different amounts of strain within the cells, and the strain changes how quickly the transistors in the cells process signals.

Also, the processor automatically retrieves standard signal delay times for each of the cells from the standard cell library. This allows the processor to automatically adjust the signal delay times for each of the cells based on which alignment context has been assigned to each of the cells, to produce adjusted delay times for each of the cells. This is performed by multiplying the signal delay times by the delay multiple of the assigned alignment context for each cell. Following this, the processor automatically performs a timing analysis of the layout using the adjusted delay times for each of the cells, and the design automation system outputs the results of the timing analysis from the interface.

These and other features are described in, or are apparent from, the following detailed description.

BRIEF DESCRIPTION OF THE DRAWINGS

Various exemplary systems and methods are described in detail below, with reference to the attached drawing figures, in which:

FIGS. 3-6 are schematic diagrams illustrating alignment contexts herein;

FIG. 7-8 are tables provided by methods and systems herein;

DETAILED DESCRIPTION

As mentioned above, sometimes integrated circuit devices perform differently based on their placement relative to other devices, and this can render the timing analysis of a circuit incorrect. For example, different amounts of strain within transistorized devices can change how quickly the transistors process signals. In view of this, the systems and methods herein assign alignment contexts to cells of integrated circuit design layouts to adjust the standard library delay of such cells based on how the alignment with adjacent devices changes strain within the cells.

More specifically, many integrated circuit designs use continuous active areas, where the active areas of a cell borders (and potentially contacts) the active area of each adjacent cell. The amount of overlap, lack of overlap (jog) of such adjacent active areas can change the amount of strain within the cells, and this can change various performance features (such as threshold voltage (Vt)), which can speed up or slow down the switching (on/off) action of a transistor, changing the delay value for a given cell from the standard delay value contained in the cell library. Therefore, the different amounts of strain produced by different alignment contexts can make the cells process signals faster or slower (change delay times), affecting the operating speed of each cell from that cell's standard delay value maintained in the cell library, and thereby affect the delay or timing of a logical path within the layout. The systems and methods described herein account for such differences in strain and delay by classifying alignment contexts based on different physical cell relationships.

Figure 1:
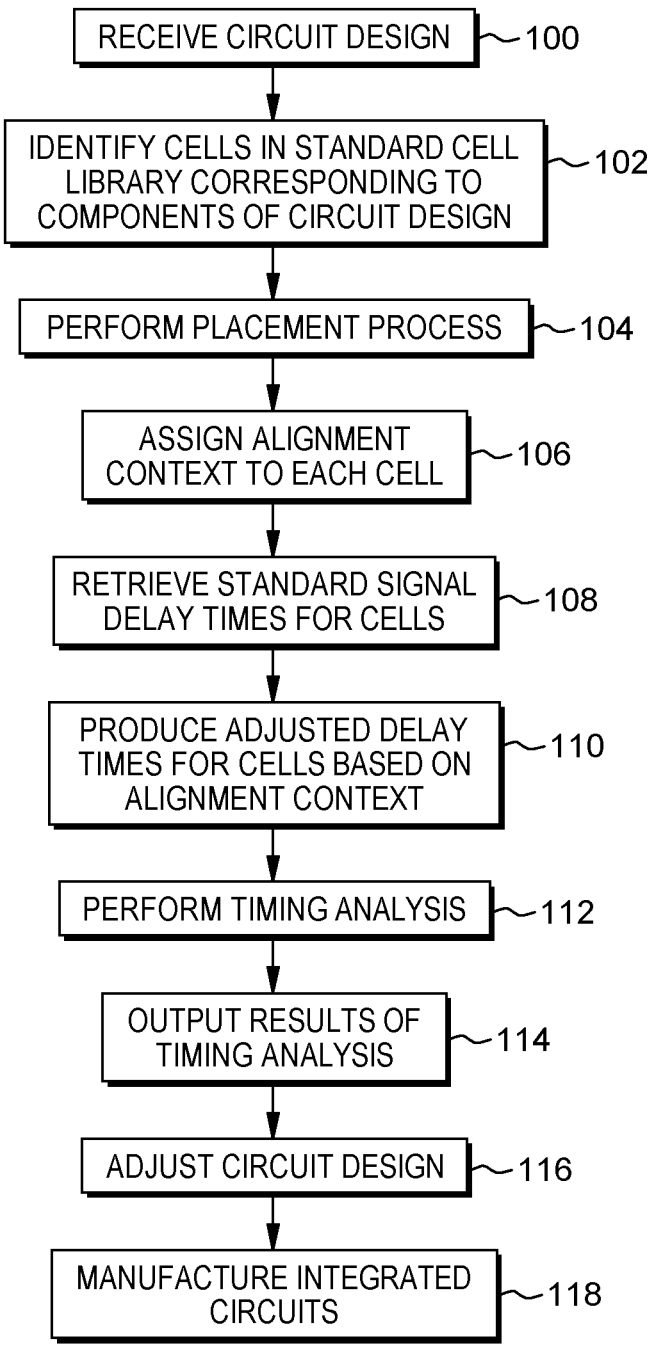
FIG. 1 is a flow diagram of various methods herein.

FIG. 1 is flowchart illustrating exemplary methods herein. In item 100, these methods receive a circuit design into a design automation system, and in item 102 automatically identify cells in a standard cell library that correspond to components within the circuit design, using a processor of the design automation system.

As shown in item 104, these methods automatically perform a placement process for the circuit design by assigning physical locations to the cells to produce a layout using the processor. The layout has continuous linear active areas of the cells adjoining one another, and the cells have different widths perpendicular to the continuous linear active areas (e.g., gates of the transistors run in a direction parallel to the "width" of the cells). In item 104, these methods place and route standard library cells that can take advantage of the connected active area (Rx) of transistors (planar or non-planar (3D) transistors) that provides performance benefits due to intelligent placement. Such is useful advanced technologies, such as reduced size fin-type field effect transistors (FinFET) and other 3D transistors.

In item 106, the methods automatically assign an alignment context to each of the cells, from previously established alignment contexts, based on how the different widths cause each of the cells to align with each of the adjoining cells, using the processor. For example, the alignment context can be assigned by comparing the ratio of the width (perpendicular to the continuous linear active areas) of a first cell to a width of a second cell contacting the first cell, to produce a width-to-width ratio, and then matching the width-to-width ratio to a table to assign one of the alignment context to each cell. Such a table includes useful placement aware timing information in look-up format, and can be used during smart post placement timing closure or sign-off. Each of the alignment contexts reference a different delay multiple that is based on how each of the alignment contexts cause different amounts of strain within the cells, and the strain changes how quickly the transistors in the cells process signals.

Also, in item 108, such methods automatically retrieve standard signal delay times for each of the cells from the standard cell library, using the processor. This allows these methods, in item 110, to automatically adjust the signal delay times for each of the cells based on which alignment context has been assigned to each of the cells, to produce adjusted delay times for each of the cells using the processor. For example, item 108 is performed by multiplying the signal delay times by the delay multiple of the assigned alignment context for each cell.

Following this, in item 112, the methods automatically perform a timing analysis of the layout using the adjusted delay times for each of the cells, and in item 114 output the results of the timing analysis from an interface of the design automation system. Further, in item 116, these methods adjust circuit design based on the results of the timing analysis; and, in item 118, manufacture integrated circuit devices using the adjusted circuit design.

An example of this is shown in FIGS. 2-6. More specifically, FIGS. 2-6 show a portion of a layout that includes different width cells 140-148 taken from a standard cell library. Such cells 140-148 correspond to components within the circuit design. The cells 140-148 have isolation gates 130 (which can be dynamic or fixed isolation gates), active gates 132, contacts 134, active areas 136, insulator areas 138, etc. The isolation gates 130 electrically isolate (insulate) adjacent cells from one another.

Figure 2:
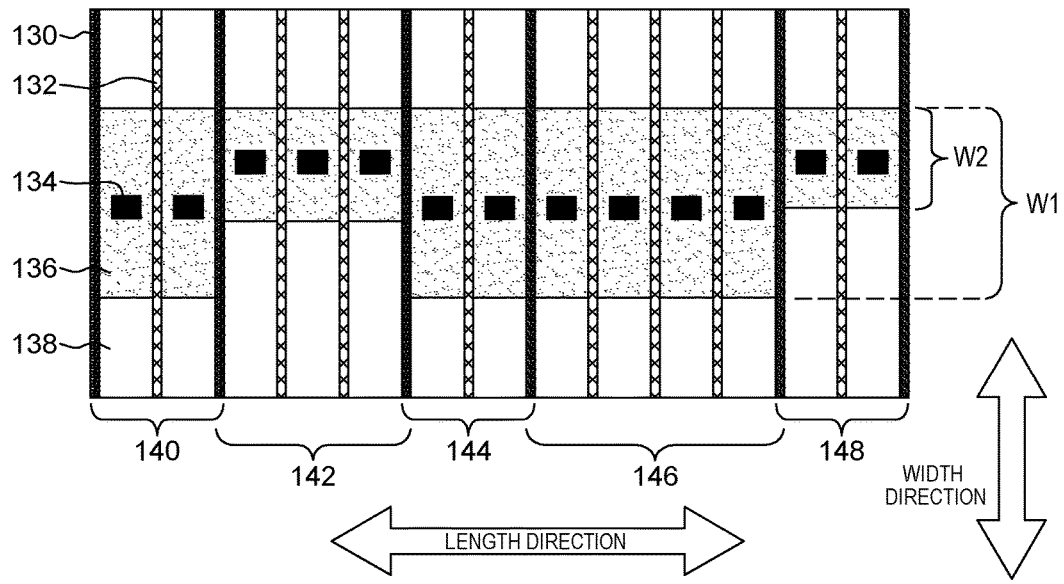
FIG. 2 is a schematic diagram illustrating a design layout herein.

The active areas 136 are regions where the doping forms components such as source areas, drain areas, channel regions, base regions, emitter regions, etc. Further, each of the active areas 136 of a cell borders (and potentially contacts) an active area 136 of an adjacent cell, thereby forming continuous active areas 136. The continuous active area 136 runs in an arbitrarily named "length" direction (as shown in FIG. 2), and each cell has a width running in an arbitrarily named width direction that is perpendicular to the length direction. Note that the gates 130, 132 of the transistors run in the width direction.

As can be seen in FIG. 2 the cells 140-148 have different widths (W1, W2) in the width direction. Therefore, some of the cells will be adjacent one or more larger or full-width cells 140, 144, 146, while other cells will be adjacent smaller cells that are less than full-width (e.g., ¾ width cells, ½ width cells, ¼ width cells, etc.), such as cells 142 and 148. The cells also have different lengths; and for example, as can be seen in FIG. 2, cells 142 and 146 are longer than cells 140, 144, and 148. The length and width of a cell varies depending upon each cell's function and the components included within the cell and, therefore, the standard cell library will have cells of many widths and lengths.

Figure 3:
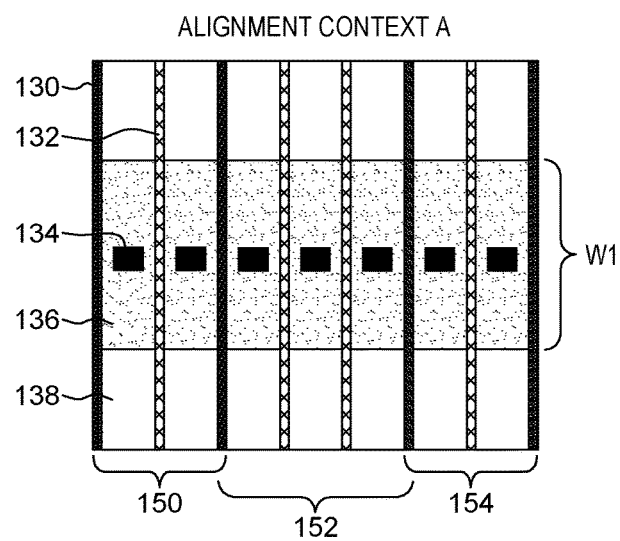
Figure 4:
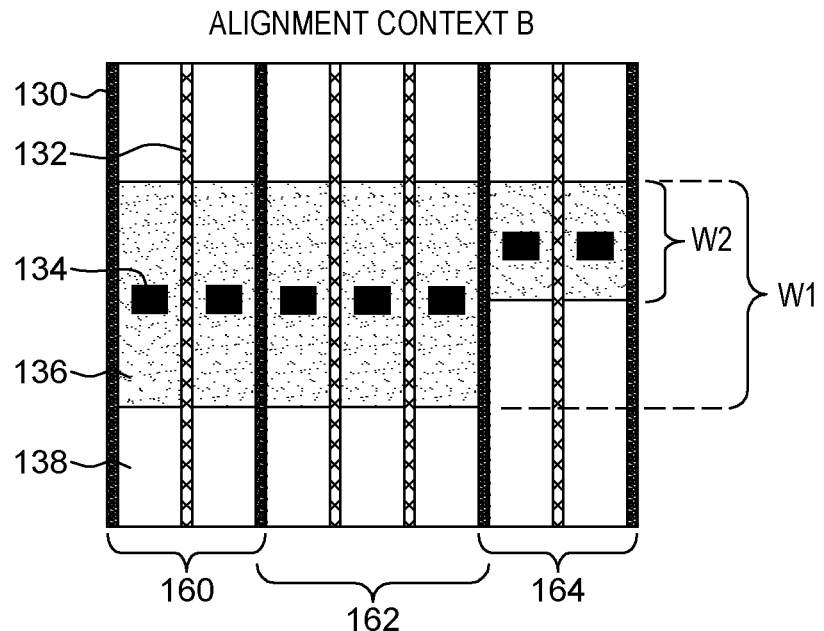
Figure 5:
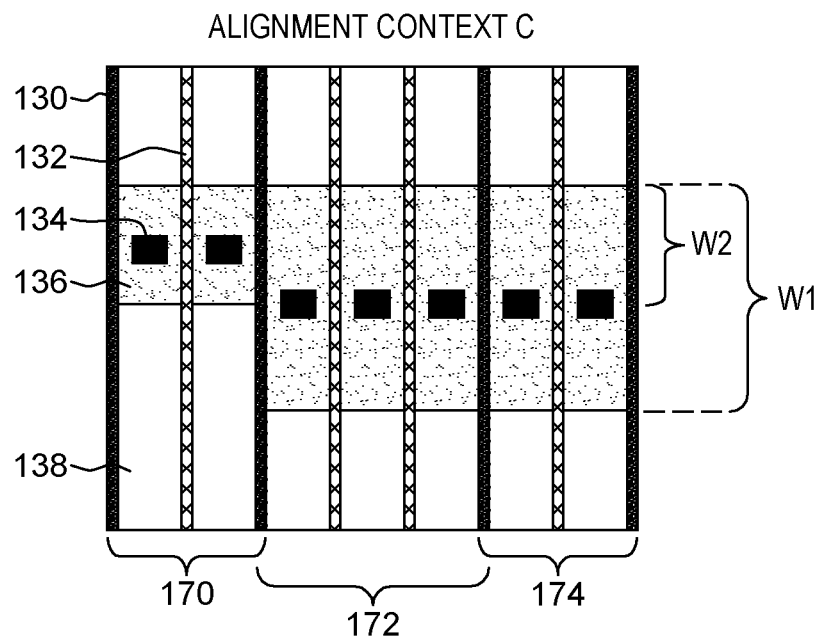
Figures 6, 7:
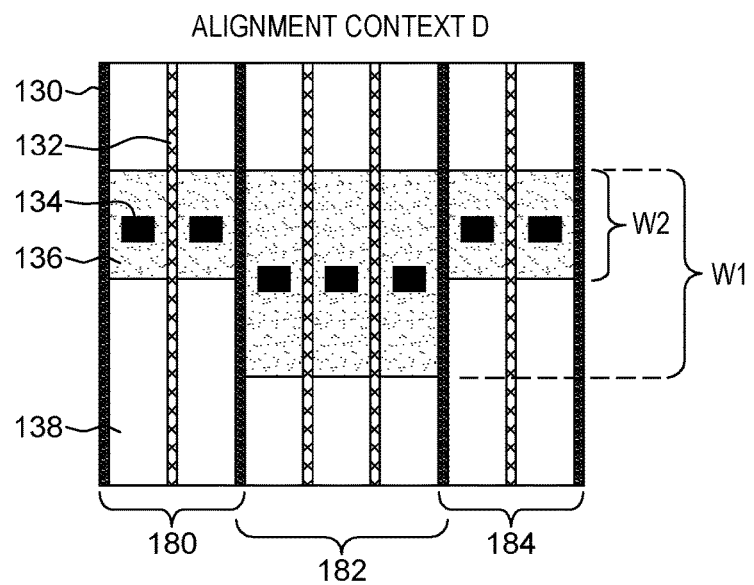

As noted above, the methods and systems herein automatically assign an alignment context to each of the cells, from previously established alignment contexts, based on how these different widths (W1, W2) cause each of the cells to align with each of the adjoining cells. For example, FIG. 3 illustrates an alignment situation (arbitrarily referred to as Alignment Context A) that can occur between adjoining cells where the contextual cell 152 (e.g., the cell having its context established) has the same width (W1) as the cells 150, 154 on each side. FIG. 4 illustrates differently aligned cells where one adjacent cell 160 is the same width (W1) as the contextual cell 162, but the other adjacent cell 164 has a width (W2) that is less than full-width (which is arbitrarily referred to as Alignment Context B). What is arbitrarily referred to as Alignment Context C is shown in FIG. 5, and this refers to a situation where one adjacent cell 170 is less than full-width (W2) as the contextual cell 172, but the other adjacent cell 174 is the same width (W1) as the contextual cell 172. FIG. 6 illustrates yet another alignment context (Alignment Context D) where both adjacent cells 180, 184 have a smaller width (W2) relative to the width (W1) of the contextual cell 182. While a limited number of exemplary alignment contexts are illustrated in FIGS. 3-6, those ordinarily skilled in the art would understand that there are many more, and that the different cell widths in different cell libraries will allow for more alignment contexts.

The alignment context of each given cell can, therefore, be assigned using many different criteria. In one example, alignment contexts can be assigned/determined by comparing the ratio of the width (perpendicular to the continuous linear active areas) of a first cell to a width of a second cell contacting the first cell, to produce a width-to-width ratio or jog amount, and then matching the width-to-width ratio to an alignment context in a table, to assign one of the alignment context to each cell.

For example, the alignment context assignment table shown in FIG. 7 shows different combinations of width-to-width ratios or jogs that correspond to different alignment contexts. Thus, consistent with the example shown in FIG. 4 for Alignment Context B, one adjacent cell 160 is the same width (W1) as the contextual cell 162 (jog of zero, or width-to-width ratio of one-to-one, or 1.0), but the other adjacent cell 164 has a width (W2) that is less than full-width, and can be one-half the W1 width (width-to-width ratio of 0.5). Therefore, inputs of 1.0 for left and 0.5 for right into the table shown in FIG. 7 results in an assignment of alignment context B to a cell. Note that FIG. 7 illustrates that ratios other than 1.0 and 0.5 are common, and that ranges of ratios can be included (e.g. for alignment contexts F-G) in the table.

In a simplified example, each pair of conductive contacts 134 on different sides of an active gate conductor 132 in FIGS. 2-6 can represent the electrical connections to source and drain regions of a planar transistor, while the active gate 132 overlies the semiconductor channel (and is separated therefrom by a gate oxide). The different alignment contexts change the stress/strain within each of the transistors (e.g., within the channel regions) and this can change various performance features (such as threshold voltage (Vt)), which can speed up or slow down the switching (on/off) action of a transistor, changing the delay value for a given cell from the delay value contained in the cell library. Therefore, the different amounts of strain produced by different alignment contexts can make the cells process signals faster or slower (change delay times), affecting the operating speed of each cell from that cell's standard delay value maintained in the cell library, and thereby affect the delay or timing of a logical path within the layout. The amount of change in cell delay produced by a given alignment context can be found by empirical testing, modeling, etc.

Thus, the delay adjustment table shown in FIG. 8 includes a different delay factor (or delay multiple) for each different alignment context (and for different types of cells). Each different delay multiple is therefore based on how each of the alignment contexts cause different amounts of strain within the cells, and the strain changes how quickly the transistors in the cells process signals. A multiple of 1.0 in the table in FIG. 8 does not change the standard delay, multiples less than 1.0 decrease delay, and multiples greater than 1.0 increase delay.

Also, such methods automatically retrieve standard signal delay times for each of the cells from the standard cell library, using the processor. This allows these methods to automatically adjust the signal delay times for each of the cells based on which alignment context has been assigned to each of the cells, to produce adjusted delay times for each of the cells using the processor. This is performed by multiplying the signal delay times by the delay multiple of the assigned alignment context for each cell. For example, if cell type 2 has a library-based delay of 0.003 s; and has an alignment context B, the delay is multiplied by 1.2 to arrive at an increased adjusted delay time of 0.0036 s.

The tables shown in FIGS. 7 and 8 can be part of a larger overall alignment context table, or can be separate tables. Additionally, those skilled in the art would understand that such tables would be substantially more extensive and that the tables illustrated are simplified to allow the concepts presented herein to be easily comprehended by the reader.

Following this, the methods and systems herein automatically perform a timing analysis of the layout using the adjusted delay times for each of the cells, and output the results of the timing analysis from an interface of the design automation system.

Figure 9:
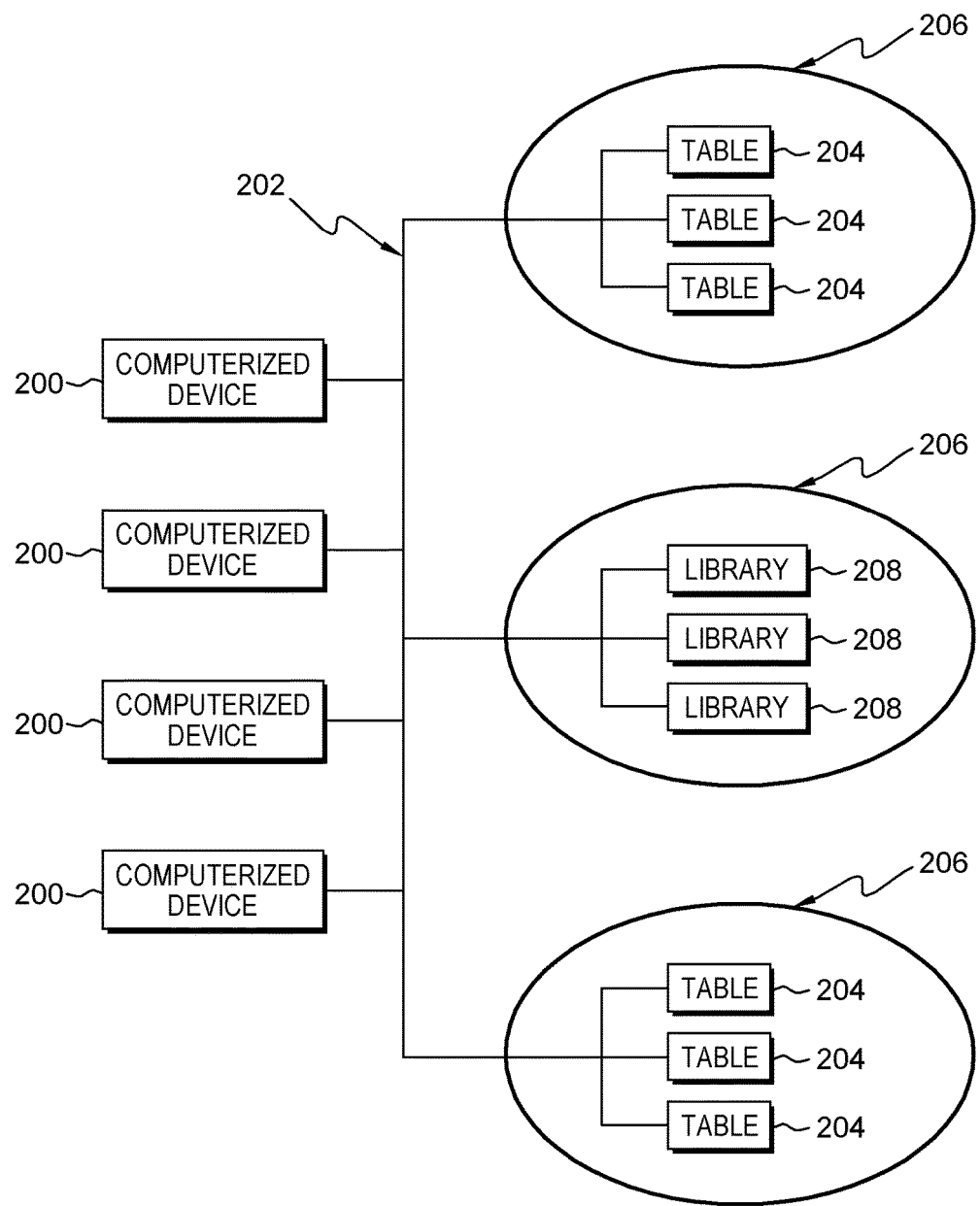
FIG. 9 is a schematic diagram illustrating systems herein.

As shown in FIG. 9, exemplary systems and methods herein include various computerized devices 200, tables 204, libraries 208, etc., located at various different physical or logical locations 206. The computerized devices 200, can include servers, processing devices, personal computers, etc., and are in communication (operatively connected to one another) by way of a local or wide area (wired or wireless) network 202.

Figure 10:
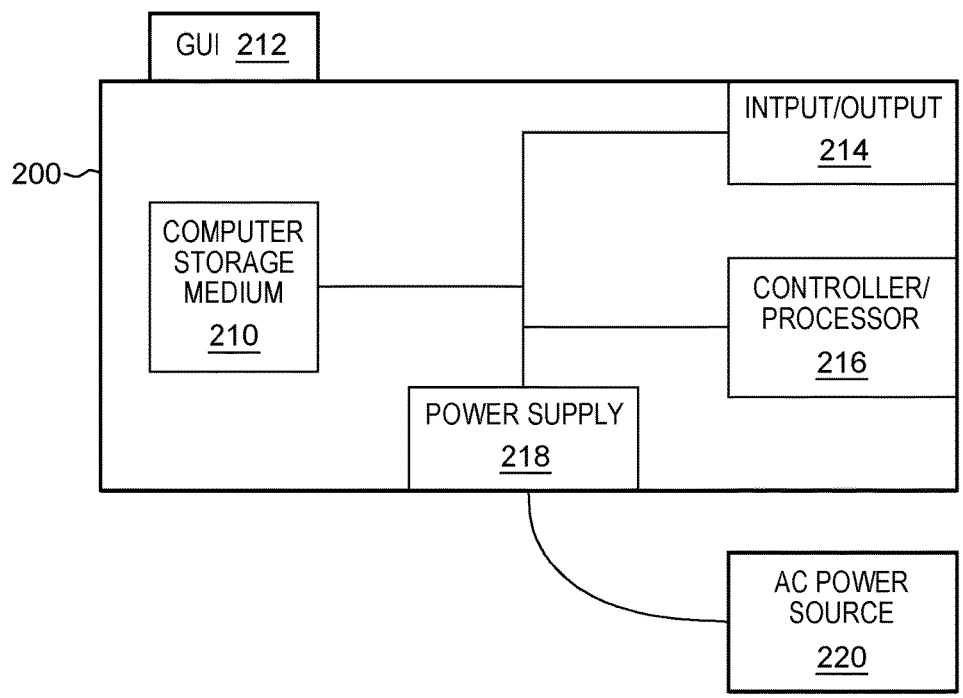
FIG. 10 is a schematic diagram illustrating devices herein.

FIG. 10 illustrates a computerized device 200, which can be used with systems and methods herein and can include, for example, a server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and includes a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 10, a body housing has one or more functional components that operate on power supplied from an alternating current (AC) source 220 by the power supply 218. The power supply 218 can include a common power conversion unit, power storage element (e.g., a battery, etc), etc.

As shown above, various design automation systems herein include (among other components) a processor 216, a standard cell library 208 operatively connected to (meaning directly or indirectly connected to) the processor 216, an alignment context table 204 operatively connected to the processor 216, an interface 212, 214 operatively connected to the processor 216, etc.

The design automation systems receive a circuit design into the interface 212, 214, and the processor 216 automatically identifies cells in the standard cell library 208 that correspond to components within the circuit design. The processor 216 automatically performs a placement process for the circuit design by assigning physical locations to the cells to produce a layout. The layout has continuous linear active areas of the cells adjoining one another, and the cells have different widths perpendicular to the continuous linear active areas (e.g., gates of the transistors run in a direction parallel to the width of the cells).

The processor 216 automatically assigns an alignment context to each of the cells, from previously established alignment contexts in the alignment context table 204, based on how the different widths cause each of the cells to align with each of the adjoining cells. For example, the alignment context can be assigned by comparing the ratio of the width (perpendicular to the continuous linear active areas) of a first cell to a width of a second cell contacting the first cell, to produce a width-to-width ratio, and then matching the width-to-width ratio to a table 204 to assign one of the alignment context to each cell. Each of the alignment contexts reference a different delay multiple that is based on how each of the alignment contexts cause different amounts of strain within the cells, and the strain changes how quickly the transistors in the cells process signals.

Also, the processor 216 automatically retrieves standard signal delay times for each of the cells from the standard cell library 208. This allows the processor 216 to automatically adjust the signal delay times for each of the cells based on which alignment context has been assigned to each of the cells, to produce adjusted delay times for each of the cells. This is performed by multiplying the signal delay times by the delay multiple of the assigned alignment context for each cell. Following this, the processor 216 automatically performs a timing analysis of the layout using the adjusted delay times for each of the cells, and the design automation system outputs the results of the timing analysis from the interface 212, 214.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

For purposes herein, a "semiconductor" is a material or structure that may include an implanted impurity that allows the material to sometimes be a conductor and sometimes be an insulator, based on electron and hole carrier concentration. As used herein, "implantation processes" can take any appropriate form (whether now known or developed in the future) and can include, for example, ion implantation, etc.

For purposes herein, an "insulator" is a relative term that means a material or structure that allows substantially less (<95%) electrical current to flow than does a "conductor." The dielectrics (insulators) mentioned herein can, for example, be grown from either a dry oxygen ambient or steam and then patterned. Alternatively, the dielectrics herein may be formed from any of the many candidate high dielectric constant (high-k) materials, including but not limited to silicon nitride, silicon oxynitride, a gate dielectric stack of SiO2 and Si3N4, and metal oxides like tantalum oxide. The thickness of dielectrics herein may vary contingent upon the required device performance.

The conductors mentioned herein can be formed of any conductive material, such as polycrystalline silicon (polysilicon), amorphous silicon, a combination of amorphous silicon and polysilicon, and polysilicon-germanium, rendered conductive by the presence of a suitable dopant. Alternatively, the conductors herein may be one or more metals, such as tungsten, hafnium, tantalum, molybdenum, titanium, or nickel, or a metal silicide, any alloys of such metals, and may be deposited using physical vapor deposition, chemical vapor deposition, or any other technique known in the art.

Within a transistor, the semiconductor (or channel region) is positioned between a conductive "source" region and a similarly conductive "drain" region and when the semiconductor is in a conductive state, the semiconductor allows electrical current to flow between the source and drain. A "gate" is a conductive element that is electrically separated from the semiconductor by a "gate oxide" (which is an insulator) and current/voltage within the gate changes the conductivity of the channel region of the transistor.

Transistor structures are formed by depositing or implanting impurities into a substrate to form at least one semiconductor channel region, bordered by shallow trench isolation regions below the top (upper) surface of the substrate. A "substrate" herein can include any material appropriate for the given purpose (whether now known or developed in the future) and can include, for example, Si, SiC, SiGe, SiGeC, other III-V or II-VI compound semiconductors, or organic semiconductor structures, etc. The "shallow trench isolation" (STI) structures are well-known to those ordinarily skilled in the art and are generally formed by patterning openings/trenches within the substrate and growing or filling the openings with a highly insulating material (this allows different active areas of the substrate to be electrically isolated from one another).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    performing a placement process for a circuit design by assigning physical locations to cells from a cell library to produce a layout using a processor, the layout has continuous linear active areas of the cells adjoining one another, and the cells have different widths perpendicular to the continuous linear active areas;
    assigning an alignment context to each of the cells, from previously established alignment contexts, based on how the different widths cause each of the cells to align with adjoining cells using the processor;
    retrieving signal delay times for each of the cells from the cell library;
    adjusting the signal delay times for each of the cells based on which alignment context has been assigned to each of the cells to produce adjusted delay times for each of the cells using the processor;
    performing a timing analysis of the layout using the adjusted delay times for each of the cells using the processor; and
    in response to the timing analysis of the layout satisfying timing requirements, adjusting the circuit design based on output results of the timing analysis and providing the circuit design for manufacturing integrated circuits.

2. The method according to claim 1, each of the alignment contexts reference a different delay multiple that is based on how each of the alignment contexts cause different amounts of strain within the cells.

3. The method according to claim 2, the adjusting of the signal delay times comprises multiplying the signal delay times by the delay multiple of the assigned alignment context for each cell.

4. The method according to claim 2, the cells include transistors and the strain changes how quickly the transistors process signals.

5. The method according to claim 1, the assigning the alignment context comprises comparing the ratio of a width perpendicular to the continuous linear active areas of a first cell to a width perpendicular to the continuous linear active areas of a second cell contacting the first cell, to produce a width-to-width ratio; and
    matching the width-to-width ratio to a table to assign one of the alignment context to the cells.

6. The method according to claim 1, the assigning the alignment context is based on the different widths of adjoining cells on each side of each of the cells.

7. The method according to claim 1, the cells have transistors that comprise planar and 3D transistors.

8. A method comprising:
    receiving a circuit design into a design automation system;
    automatically identifying cells in a standard cell library that correspond to components within the circuit design, using a processor of the design automation system;
    automatically performing a placement process for the circuit design by assigning physical locations to the cells to produce a layout using the processor, the layout has continuous linear active areas of the cells adjoining one another, and the cells have different widths perpendicular to the continuous linear active areas;
    automatically assigning an alignment context to each of the cells, from previously established alignment contexts, based on how the different widths cause each of the cells to align with adjoining cells using the processor;
    automatically retrieving signal delay times for each of the cells from the standard cell library using the processor;
    automatically adjusting the signal delay times for each of the cells based on which alignment context has been assigned to each of the cells to produce adjusted delay times for each of the cells using the processor;
    automatically performing a timing analysis of the layout using the adjusted delay times for each of the cells using the processor;
    outputting results of the timing analysis from an interface of the design automation system; and
    in response to the timing analysis of the layout satisfying timing requirements, adjusting the circuit design based on output results of the timing analysis and providing the circuit design for manufacturing integrated circuits.

9. The method according to claim 8, each of the alignment contexts reference a different delay multiple that is based on how each of the alignment contexts cause different amounts of strain within the cells.

10. The method according to claim 9, the adjusting of the signal delay times comprises multiplying the signal delay times by the delay multiple of the assigned alignment context for each cell.

11. The method according to claim 9, the cells include transistors and the strain changes how quickly the transistors process signals.

12. The method according to claim 8, the assigning the alignment context comprises comparing the ratio of a width perpendicular to the continuous linear active areas of a first cell to a width perpendicular to the continuous linear active areas of a second cell contacting the first cell, to produce a width-to-width ratio; and
    matching the width-to-width ratio to a table to assign one of the alignment context to the cells.

13. The method according to claim 8, the assigning the alignment context is based on the different widths of adjoining cells on each side of each of the cells.

14. The method according to claim 8, the cells have transistors that have gates that run in a direction parallel to the width of the cells.

15. A design automation system comprising:
    a processor;
    a standard cell library operatively connected to the processor;
    an alignment context table operatively connected to the processor; and
    an interface operatively connected to the processor, the processor automatically identifies cells in the standard cell library that correspond to components within a circuit design, the processor automatically performs a placement process for the circuit design by assigning physical locations to the cells to produce a layout, the layout has continuous linear active areas of the cells adjoining one another, and the cells have different widths perpendicular to the continuous linear active areas, the processor automatically assigns an alignment context to each of the cells, from previously established alignment contexts in the alignment context table, based on how the different widths cause each of the cells to align with adjoining cells, the processor automatically retrieves standard signal delay times for each of the cells from the standard cell library, the processor automatically adjusts the signal delay times for each of the cells based on which alignment context has been assigned to each of the cells to produce adjusted delay times for each of the cells, the processor automatically performs a timing analysis of the layout using the adjusted delay times for each of the cells, the interface automatically outputs results of the timing analysis, and in response to the timing analysis of the layout satisfying timing requirements, the circuit design is adjusted based on output results of the timing analysis and the interface provides the circuit design for manufacturing integrated circuits.

16. The design automation system according to claim 15, each of the alignment contexts reference a different delay multiple that is based on how each of the alignment contexts cause different amounts of strain within the cells.

17. The design automation system according to claim 16, the processor adjusts the signal delay times by multiplying the signal delay times by the delay multiple of the assigned alignment context for each cell.

18. The design automation system according to claim 16, the cells include transistors and the strain changes how quickly the transistors process signals.

19. The design automation system according to claim 15, the processor assigns the alignment context by:
comparing the ratio of a width perpendicular to the continuous linear active areas of a first cell to a width perpendicular to the continuous linear active areas of a second cell contacting the first cell, to produce a width-to-width ratio; and
matching the width-to-width ratio to a table to assign one of the alignment context to the cells.

20. The design automation system according to claim 15, the processor assigns the alignment context based on the different widths of adjoining cells on each side of each of the cells.

* * * * *